May 12, 1925.
L. M. BOLIN
1,537,925
DENTAL X-RAY FILM PACKAGE
Filed Aug. 7, 1922
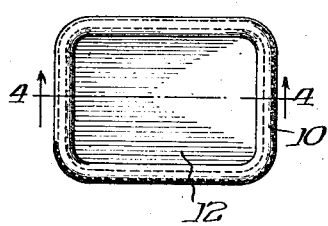
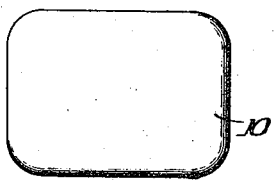
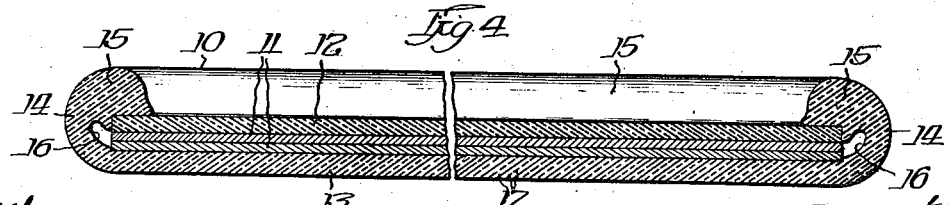
Inventor
Leonard M. Bolin, Patented May 12, 1925.

1,537,925

UNITED STATES PATENT OFFICE.

LEONARD M. BOLIN, OF CHICAGO, ILLINOIS, ASSIGNOR OF ONE-HALF TO STANLEY BOLIN, OF CHICAGO, ILLINOIS.

DENTAL X-RAY-FILM PACKAGE.

Application filed August 7, 1922. Serial No. 580,107.

*To all whom it may concern:*

Be it known that I, LEONARD M. BOLIN, a citizen of the United States, residing at Chicago, in the county of Cook and State of Illinois, have invented certain new and useful Improvements in Dental X-Ray-Film Packages, of which the following is a specification.

This invention relates in a general way to the art of registering the effects of substances upon photographically sensitized films by the use of Röntgen rays, and is particularly concerned with film packages such as are suitable for employment in dental X-ray work.

The primary object of the invention resides in the provision of a dental X-ray film package characterized by a container for the films which is re-fillable and is possessed of numerous other advantageous features.

While the foregoing statement is indicative of the nature of the present invention, other objects and advantages not expressly referred to in this disclosure will be appreciated upon a full comprehension of the novel feature presented in the construction, arrangement and manner of employment of this film package.

In order that the invention may be readily understood, an exemplifying embodiment of the same is set forth in the accompanying drawing and in the following detailed description based thereon. Obviously the invention is susceptible of embodiment in other and varied constructional forms without departure from the essence of the invention or the sacrifice of its material advantages; wherefore it is to be understood that the drawing and description are to be considered in an illustrative and not in an unnecessarily limiting sense.

In the drawing,

Fig. 1 is a front view of the film package;
Fig. 2 is a rear view of the same;
Fig. 3 is a grouped view of the several elements comprising the package, showing in perspective the elements as separated before or after their assemblage; and
Fig. 4 is an enlarged sectional view taken on the line 4—4 of Fig. 1.

Referring now with more particularity to the several views of the drawing, it will be observed that the dental X-ray film package of this invention comprises a container 10 within which is compactly held one or more sensitized films 11 and a cover sheet 12. The package is intended primarily for use in the making of Röntgenograms of the teeth, and is accordingly of convenient size and shape for insertion in the mouth.

The most salient feature of this invention is found in the construction, properties and manner of use of the container 10. The container consists of a frame including a backing portion 13, marginal portions 14, beading 15, and a groove or seat 16. The marginal portions 14 of the frame are preferably integral with the backing portion and extend forwardly and inwardly therefrom to points just within the preferably rounded rectangular contour of the backing portion where the marginal portions terminate in the enlarged continuous beading 15. The container is made of a resiliently yieldable material, preferably elastic rubber, and the beading 15 presses inwardly against the inner face of the backing portion 13 and substantially closes the groove 16 therebetween when the container is empty. The material from which the container is made has incorporated therein finely divided particles 17 of lead sufficient in quantity to stop the passage of the Röntgen rays without interfering with the resilient flexibility of the container. While lead is preferable for this purpose, it will be appreciated that any similar material may be used which is opaque to Röntgen rays.

The films 11 and the cover sheet 12 are generally similar to the container 10 in shape, and are of a common size which is slightly greater in both directions than the open area within the inner periphery of the beading 15. The films 11 are the ordinary sensitized sheets of material commonly used in X-ray work, and the cover sheet 12 is preferably of celluloid so colored as to be opaque to light rays.

In the assembling of the package the films and the cover sheet are first arranged in stacked relation one upon the other, and their edge portions then inserted in the groove 16 of the container with the cover sheet exposed in the open area within the periphery of the beading 15. To permit this insertion the beading is necessarily forced away from the backing portion a short distance and stretched peripherally to accommodate the parts inserted. When the films and the cover sheet are properly positioned as shown in Fig. 4, the elastic yieldable beading forming the edge of the container will press snugly inwards against the cover sheet and will conform, because of this pressure and its resiliently yielding nature, tightly against the surface of the cover sheet, thereby providing a compact film package which is sealed in a most efficient and simple manner against the entrance of light, air or moisture.

It will be appreciated that the container of this invention may be easily sterilized and refilled indefinitely with films, and need not be injured in any way during the loading and unloading operations, since it is only necessary, in the changing of the films to stretch slightly the edges of the container and snap the edges of the films and cover sheet past the same.

Another advantage had with the employment of this package is in that portion of the structure which presents in effect a vacuum cup by the resiliently yielding beading and the cavity within the inner periphery thereof whereby when the container is held against a surface of the mouth with the front or celluloid side of the same pressed forwardly to exhaust the air in the cavity the vacuum formed will ordinarily hold the package firmly in the position in which it is thus placed, provided that the particular surface of the mouth against which the package is pressed is so shaped as to be compatible with the creation of a vacuum. The package, being resiliently yieldable, may be held against any desired portion of the mouth regardless of the contour thereof, and upon being released will immediately assume its substantially flat shape.

I claim:

1. A container for films consisting of a body portion, and forwardly and inwardly turned resiliently yieldable edge portions on the said body portion adapted to encompass elastically the other elements of the assembly.

2. A container for films consisting of a body portion, and forwardly and inwardly turned resiliently yieldable edge portions on the said body portion adapted to encompass elastically the edges of the other elements of the assembly.

3. A container for films consisting of a body portion opaque to Röntgen rays, and forwardly and inwardly turned resiliently yieldable edge portions on the said body portion adapted to encompass elastically the other elements of the assembly.

4. A resiliently flexible container for films consisting of a body portion, and forwardly and inwardly turned edge portions on the said body portion adapted to encompass the other elements of the assembly.

5. A resiliently flexible container for films consisting of a body portion, and forwardly and inwardly turned edge portions on the said body portion adapted to encompass the other elements of the assembly, said container being formed of elastic rubber.

6. A resiliently flexible container for films consisting of a backing portion opaque to Röntgen rays, and forwardly and inwardly turned edge portions on the said body portion adapted to encompass the other elements of the assembly, said container being formed of elastic rubber and having finely divided particles of lead incorporated therein.

7. In a film package, a sensitized film, a cover sheet for the same, and a resiliently flexible container consisting of a body portion and forwardly and inwardly turned edge portions on the said body portion for encompassing the film and the cover sheet.

8. In a film package, a sensitized film, a cover sheet for the same, and a resiliently flexible container consisting of a body portion and forwardly and inwardly turned edge portions on the said body portion for encompassing the edges of the film and of the cover sheet.

9. In a film package, a sensitized film, a cover sheet for the same, and a container consisting of a body portion and forwardly and inwardly turned resiliently yieldable edge portions on the said body portion for elastically encompassing the film and the cover sheet.

10. In a film package, a sensitized film, a front cover sheet for the same opaque to light rays, and a container consisting of a backing portion opaque to Röntgen rays and resiliently yieldable edge portions forwardly and inwardly turned from the said backing portion for elastically encompassing the edges of the film and of the cover sheet.

11. In a film package, two sensitized films, a front cover sheet for the same of resilient material opaque to light rays, and a container consisting of a normally flat backing portion and resiliently yieldable edge portions forwardly and inwardly turned from the said backing portions for elastically encompassing the edges of the films and of the front cover sheet, said container being formed of elastic rubber and having finely divided particles of lead incorporated therein.

12. A container for sensitized dental X-ray films consisting of a body portion of inherently compressible material adapted to cushion the contents of the container against the mouth, and forwardly and inwardly turned integral elastic edge portions on the said body portion adapted to encompass the contents of the container and permit removal of the same without permanent distortion of the container, whereby the same may be refilled.

13. A container for sensitized dental X-ray films consisting of an elastic rubber body portion adapted to cushion the contents of the container against the mouth, and forwardly and inwardly turned integral elastic rubber edge portions on the said body portion adapted to encompass the contents of the container and permit removal of the same without permanent distortion of the container, whereby the same may be refilled.

14. A container for sensitized dental X-ray films consisting of a body portion and forwardly and inwardly turned elastic edge portions on the said body portion for encompassing the contents of the container and compressing the marginal portions of the same between the back and edge portions of the container, whereby to provide a moisture-proof and light-proof casing for the marginal portions of the contents which is expansible without permanent distortion in order to permit removal or replacement of the contents.

15. A dental X-ray film package, comprising a stack of sensitized and non-sensitized sheets, and a soft rubber frame elastically embracing the marginal portions of the sheets and presenting when thus assembled with the sheets an inwardly opening groove accommodating the sheet edges, said frame holding the sheets together in a marginally sealed condition.

16. A dental X-ray film package, comprising a flexible stack of sensitized and non-sensitized sheets, and a soft rubber frame elastically embracing the marginal portions of the sheets and presenting when thus assembled with the sheets an inwardly opening groove accommodating the sheet edges, said frame holding the sheets together in a marginally sealed condition when the stack of contained sheets is either flat or bent.

In testimony whereof I have hereunto subscribed my name.

LEONARD M. BOLIN.